(12) United States Patent  (10) Patent No.: US 7,783,957 B2
Carnevale et al.  (45) Date of Patent: *Aug. 24, 2010

(54) APPARATUS FOR IMPLEMENTING ENHANCED VERTICAL ECC STORAGE IN A DYNAMIC RANDOM ACCESS MEMORY

(75) Inventors: Michael Joseph Carnevale, Rochester, MN (US); Steven B. Herndon, Endicott, NY (US); Daniel Frank Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 12/168,971

(22) Filed: Jul. 8, 2008

(65) Prior Publication Data

US 2008/0294841 A1   Nov. 27, 2008

Related U.S. Application Data

(63) Continuation of application No. 11/071,086, filed on Mar. 3, 2005, now Pat. No. 7,451,380.

(51) Int. Cl.
*G11C 29/00* (2006.01)
(52) U.S. Cl. ...................................... 714/766
(58) Field of Classification Search ................. 714/766, 714/773
See application file for complete search history.

(56) References Cited

U.S. PATENT DOCUMENTS

| | | |
|---|---|---|
| 5,056,095 A | 10/1991 | Horiguchi et al. |
| 5,058,115 A | 10/1991 | Blake et al. |
| 5,058,116 A | 10/1991 | Chao et al. |
| 5,127,014 A | 6/1992 | Raynham |
| 5,172,379 A | 12/1992 | Burrer et al. |
| 5,313,464 A | 5/1994 | Reiff |
| 5,313,624 A | 5/1994 | Harriman et al. |
| 5,343,426 A | 8/1994 | Cassidy et al. |
| 5,392,288 A | 2/1995 | Rudman et al. |
| 5,459,742 A | 10/1995 | Cassidy et al. |
| 5,740,188 A | 4/1998 | Olarig |
| 5,754,753 A | 5/1998 | Smelser |
| 5,841,795 A | 11/1998 | Olarig et al. |
| 5,878,059 A | 3/1999 | Maciellan |
| 5,896,404 A | 4/1999 | Kellogg et al. |
| 5,922,080 A | 7/1999 | Olarig |
| 5,956,743 A | 9/1999 | Bruce et al. |
| 6,158,040 A | 12/2000 | Ho |
| 6,233,322 B1 | 5/2001 | Cannon et al. |
| 6,353,910 B1 * | 3/2002 | Carnevale et al. ........... 714/763 |
| 6,510,490 B2 | 1/2003 | Fuma et al. |
| 7,451,380 B2 * | 11/2008 | Carnevale et al. ........... 714/766 |
| 2004/0117566 A1 * | 6/2004 | McClannahan et al. ..... 711/154 |

* cited by examiner

*Primary Examiner*—Stephen M Baker
(74) *Attorney, Agent, or Firm*—Joan Pennington

(57) ABSTRACT

A method and apparatus are provided for implementing enhanced vertical ECC storage in a dynamic random access memory. A dynamic random access memory (DRAM) is split into a plurality of groups. Each group resides inside a DRAM row address strobe (RAS) page so that multiple locations inside a group can be accessed without incurring an additional RAS access penalty. Each group is logically split into a plurality of segments for storing data with at least one segment for storing ECC for the data segments. For a write operation, data are written in a data segment and then ECC for the data are written in an ECC segment. For a read operation, ECC are read from an ECC segment, then data are read from the data segment.

11 Claims, 18 Drawing Sheets

FIG. 2A

GROUP 200

| FLAT ADDRESS 208 | DRAM CHIP PAGE 0 | PHYSICAL ADDRESS 206 |
|---|---|---|
| 0000:007F | SEGMENT 202, #0<br>128 BYTES | 0000:007F |
| 0080:00FF | SEGMENT 202, #1<br>128 BYTES | 0080:00FF |
| 0100:017F | SEGMENT 202, #2<br>128 BYTES | 0100:017F |
| 0180:01FF | SEGMENT 202, #3<br>128 BYTES | 0180:01FF |
| 0200:027F | SEGMENT 202, #4<br>128 BYTES | 0200:027F |
| 0280:02FF | SEGMENT 202, #5<br>128 BYTES | 0280:02FF |
| 0300:037F | SEGMENT 202, #6<br>128 BYTES | 0300:037F |
| SECTION 204, ECC | SEG 0 ECC - 16 BYTES | 0380:038F |
| | SEG 1 ECC - 16 BYTES | 0390:039F |
| | SEG 2 ECC - 16 BYTES | 03A0:03AF |
| | SEG 3 ECC - 16 BYTES | 03B0:03BF |
| | SEG 4 ECC - 16 BYTES | 03C0:03CF |
| | SEG 5 ECC - 16 BYTES | 03D0:03DF |
| | SEG 6 ECC - 16 BYTES | 03E0:03EF |
| | UNUSED - 16 BYTES | 03F0:03FF |

FIG. 2B

GROUP 200

| FLAT ADDRESS 208 | DRAM CHIP PAGE 1 | PHYSICAL ADDRESS 206 |
|---|---|---|
| 0380:03FF | SEGMENT 202, #0<br>128 BYTES | 0400:047F |
| 0400:047F | SEGMENT 202, #1<br>128 BYTES | 0480:04FF |
| 0480:04FF | SEGMENT 202, #2<br>128 BYTES | 0500:057F |
| 0500:057F | SEGMENT 202, #3<br>128 BYTES | 0580:05FF |
| 0580:05FF | SEGMENT 202, #4<br>128 BYTES | 0600:067F |
| 0600:067F | SEGMENT 202, #5<br>128 BYTES | 0680:06FF |
| 0680:06FF | SEGMENT 202, #6<br>128 BYTES | 0700:077F |
| SECTION 204, ECC | SEG 0 ECC - 16 BYTES | 0780:078F |
| | SEG 1 ECC - 16 BYTES | 0790:079F |
| | SEG 2 ECC - 16 BYTES | 07A0:07AF |
| | SEG 3 ECC - 16 BYTES | 07B0:07BF |
| | SEG 4 ECC - 16 BYTES | 07C0:07CF |
| | SEG 5 ECC - 16 BYTES | 07D0:07DF |
| | SEG 6 ECC - 16 BYTES | 07E0:07EF |
| | UNUSED - 16 BYTES | 07F0:07FF |

8-BYTE WRITES

WRITE-ADDR 0h         WRITE-ADDR 8h

FIG. 3C

8-BYTE WRITES

WRITE-ADDR 10h        WRITE-ADDR 18h

FIG. 3D

16-BYTE WRITES

WRITE-ADDR 0h  WRITE-ADDR 10h

FIG. 3K

16-BYTE WRITES

WRITE-ADDR 20h  WRITE-ADDR 30h

FIG. 3L

16-BYTE READ

32-BYTE READ

APPARATUS FOR IMPLEMENTING ENHANCED VERTICAL ECC STORAGE IN A DYNAMIC RANDOM ACCESS MEMORY

This application is a continuation application of Ser. No. 11/071,086 filed on Mar. 3, 2005.

FIELD OF THE INVENTION

The present invention relates to a method and apparatus for implementing enhanced vertical error correction coding (ECC) storage in a dynamic random access memory.

DESCRIPTION OF THE RELATED ART

U.S. Pat. No. 6,353,910 to Carnevale et al., issued Mar. 5, 2002, and assigned to the present assignee, discloses methods and apparatus for implementing error correction coding (ECC) in a dynamic random access memory (DRAM) utilizing vertical ECC storage. An integral number of available data blocks are identified for each page of the DRAM. Each data block includes a defined number of data and ECC bytes. Data and ECC bytes are stored in the identified integral number of data blocks for each page. The remaining bytes in each page are used as padding. The disclosed method vertically stores ECC in 2**N byte word width DRAM memory system, such as 1-byte, 2-byte, 4-byte, 8-byte, and the like.

Currently DRAM modules have new operating modes. For example, DDRII memories burst data with a minimum burst size of two DQS pulses, which is a minimum burst size of 4 data words. A new vertical ECC method is needed to take advantage of these DDRII DRAM characteristics.

SUMMARY OF THE INVENTION

Principal aspects of the present invention are to provide a method and apparatus for implementing enhanced vertical error correction coding (ECC) storage in a dynamic random access memory. Other important aspects of the present invention are to provide such method and apparatus for implementing enhanced vertical ECC storage in a dynamic random access memory substantially without negative effect and that overcome many of the disadvantages of prior art arrangements.

In brief, a method and apparatus are provided for implementing enhanced vertical ECC storage in a dynamic random access memory. A dynamic random access memory (DRAM) is split into a plurality of groups. Each group resides inside a DRAM row address strobe (RAS) page so that multiple locations inside a group can be accessed without incurring an additional RAS access penalty. Each group is logically split into a plurality of segments for storing data with at least one segment for storing ECC for the data segments. For a write operation, data are written in a data segment and then ECC for the data are written in an ECC segment. For a read operation, ECC are read from an ECC segment, then data are read from the data segment.

In accordance with features of the invention, each of the multiple GROUPs includes, for example, 1K-bytes (1024 or 2**10 bytes). Each GROUP includes, for example, eight segments of 128-bytes. Seven of the segments store data and one segment stores ECC for the data segments, for example, with one byte of ECC in the ECC segment for eight bytes of data in the data segment, with 16-bytes defined as unused in the ECC segment. The data stays aligned to the word width, eliminating the need for multiplexing or aligning of the data, and this simplifies the design and improves the timing critical paths. The ECC does need to be multiplexed in hardware to align with the data word for ECC generation and correction, and since ECC is read early and written later than the data, ECC access is not in the timing critical path.

In accordance with features of the invention, with a four-byte wide bus for a large read burst, a row address strobe (RAS) access is issued, then a column address strobe (CAS) access to read a first 16-bytes of ECC followed by a first 128-bytes of data of the data segment, followed by a read of a next 16-bytes of the ECC of the ECC segment, then a next 128-bytes of data of the data segment, and this sequence is repeated as required to complete the large read burst.

In accordance with features of the invention, for a large write, a row address strobe (RAS) access is issued, then a column address strobe (CAS) access to write a first 128-bytes of data of the data segment, followed by a write of a first 16-bytes of the ECC in the ECC segment, then a next 128-bytes of data is written in a next data segment, followed by a write of a next 16-bytes of the ECC in the ECC segment and this sequence is repeated as required to complete the write.

In accordance with features of the invention, for access smaller than 128-bytes, for a read 16-bytes of ECC are read first then N bytes of DATA are read, and for a write, N bytes of DATA are written followed by a 16-byte ECC written with a DATA MASK used to mask off the ECC bytes that are not modified.

In accordance with features of the invention, for access larger than a group in the DRAM having multiple bank support, a next group in order is placed under a next bank, so that a burst can cross from one group to a next logical group without the wait for the current RAS page to be closed then reopened, with groups ordered from RAS N bank 0, to RAS N bank 1, to RAS N bank 2 to RAS N bank 3 to RAS N+1 bank 0 to RAS N+1 bank 1, and the like.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A and 2B are diagrams illustrating an exemplary GROUP residing inside a DRAM RAS page for organizing DATA and ECC in the DRAM of FIG. 1 with the preferred 4-byte bus embodiment for the first two pages, with this pattern repeating for subsequent pages in accordance with the preferred embodiment;

DETAILED DESCRIPTION OF THE PREFERRED EMBODIMENTS

In accordance with features of the preferred embodiments, there are provided a unique method for organizing DATA and ECC in a DRAM, and a unique method for accessing DATA and ECC. The method and apparatus for implementing enhanced vertical ECC storage in a dynamic random access memory of the invention provides a major enhancement for a storage adaptor, allowing reduced cost and extended battery life through the use of fewer DRAM chips eliminating the need for a separate ECC chip. For storage adaptors it is not the size of memory that is a problem, since DRAM chips typically are very large, it is the number of chips required to provide ECC protection. Since the ECC protection required is not needed to cover hard kills, but just to cover soft fails of individual bit locations, the method and apparatus for implementing enhanced vertical ECC storage in a dynamic random access memory of the invention allows two ×16 DRAM chips to be used instead of three ×16 chips, or five ×8 DRAM chips with the preferred 4-byte bus embodiment; the invention allows one ×16 DRAM chip for a 2-byte bus embodiment and four ×16 DRAM chip for a 8-byte bus embodiment.

Other advantages over some known arrangements are that the data stays aligned to the word width, eliminating the need for multiplexing or aligning of the data, and this simplifies the design and improves the timing critical paths. The ECC does need to be multiplexed in hardware to align with the data word for ECC generation and correction, and since ECC is read early and written later than the data, ECC access is not in the timing critical path.

Figure 1:
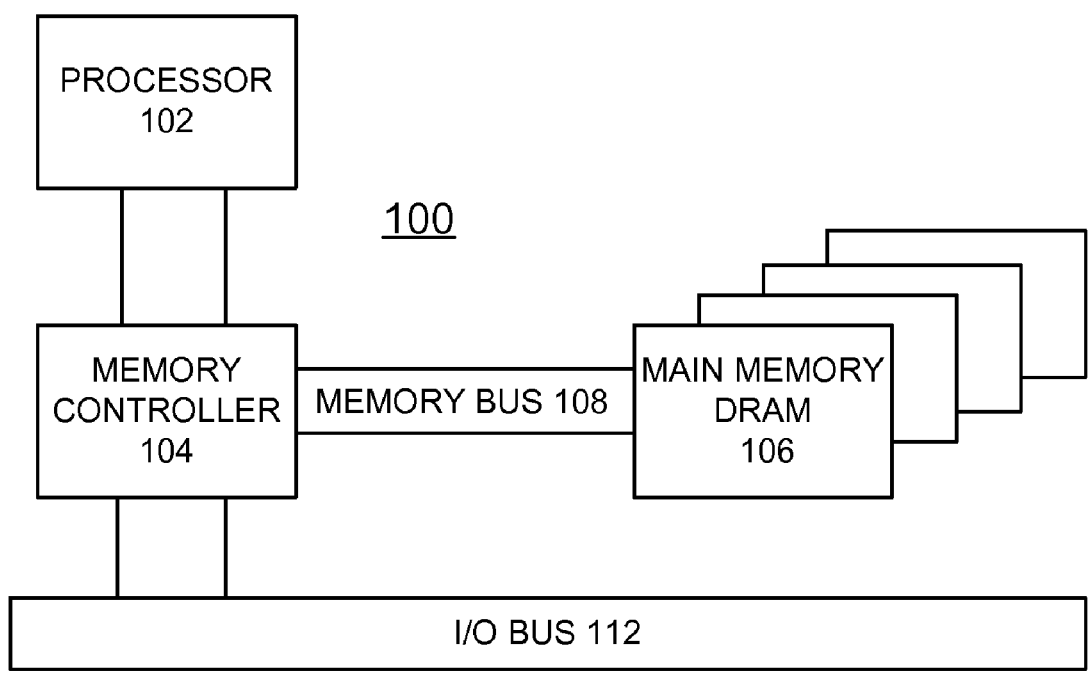
FIG. 1 illustrates a memory system generally for implementing enhanced error correction coding (ECC) in a dynamic random access memory (DRAM) utilizing vertical ECC storage of the preferred embodiment in accordance with the preferred embodiment.

Having reference now to the drawings, in FIG. 1, there is shown a memory system generally designated by reference character 100 for implementing enhanced error correction coding (ECC) in a dynamic random access memory (DRAM) utilizing vertical ECC storage of the preferred embodiment. System 100 includes a processor 102, a memory controller 104 coupled to a main memory 106 via a memory bus 108. An input/output (IO) bus 112 is connected to the memory controller 104. Main memory 106 is a DRAM based memory that implements enhanced vertically storing ECC of the preferred embodiment. Multiple banks are supported in the DRAM module 106. Data Mask bits (DM) can be used to mask off any byte write of a burst.

Referring now to FIGS. 2A and 2B, there is shown an exemplary GROUP 200 residing inside a DRAM RAS page for organizing DATA and ECC in the DRAM 106 of FIG. 1 in accordance with the preferred embodiment. A total DRAM 106 is split into multiple GROUPs 200, such as with each of the multiple GROUPs of 1K-byte (1024 or 2**10). Each GROUP 200 resides inside a DRAM RAS page so that multiple locations inside a GROUP can be accessed without incurring an additional RAS access penalty. Each GROUP 200 is logically split into a plurality of SECTIONs or segments 202, #0-6, such as seven 128-byte data SECTIONs and one 128-byte SECTION 204 for storing ECC, where the last 16-bytes of the ECC SECTION are never used. There is one byte of ECC in the ECC SECTION 204 for each 8 bytes of data in the DATA SECTION 202. As shown, ECC SECTION 204 includes a respective 16-bytes of ECC for each respective segment 202, #0-6.

FIGS. 2A and 2B illustrate a start of address mapping, with addresses continuing through all of DRAM 106. For each DRAM page, physical addresses 206 increase by 400h while flat addresses 208 increase by 380h for each DRAM page or group 200 as shown in FIGS. 2A and 2B.

In accordance with features of the preferred embodiments, with a 4-byte wide DRAM 106, for a large read burst, memory controller 104 issues a row address strobe (RAS) access, then a column address strobe (CAS) access to read the first 16-bytes of the ECC SECTION 204 followed by the first 128-bytes of the DATA SECTION 202, followed by the next 16-bytes of the ECC SECTION 204, then the next 128-bytes of the DATA SECTION 202, and this sequence is repeated as needed. In this case, 16-bytes is a minimum that can be read on a 4-byte wide memory in DDRII mode for DRAM 106.

In accordance with features of the preferred embodiments, likewise for a write, memory controller 104 issues a RAS access, then a CAS access to write the first 128-bytes of a DATA SECTION 202, then to write the first 16-bytes of the ECC SECTION 204, then to write the second 128-bytes of a DATA SECTION, then write the second 16-bytes of the ECC SECTION, and this sequence is repeated as needed.

In accordance with features of the preferred embodiments, for access smaller than 128-bytes: they work in a similar manner, 16-bytes of ECC read first then N bytes of DATA read, or N bytes of DATA written followed by a 16-byte ECC written with the DATA MASK used to mask off the ECC bytes that were not modified.

In accordance with features of the preferred embodiments, for access larger than a GROUP 200: Since the DRAM 106 has multiple bank support, the next group in order will be placed under the next bank, so that a burst can cross from one GROUP to the next logical GROUP without the wait for the current RAS page to be closed then reopened. So GROUPs 200 run from RAS N bank 0 to RAS N bank 1 to RAS N bank 2 to RAS N bank 3 to RAS N+1 bank 0 to RAS N+1 bank 1, and the like.

Figure 3A:
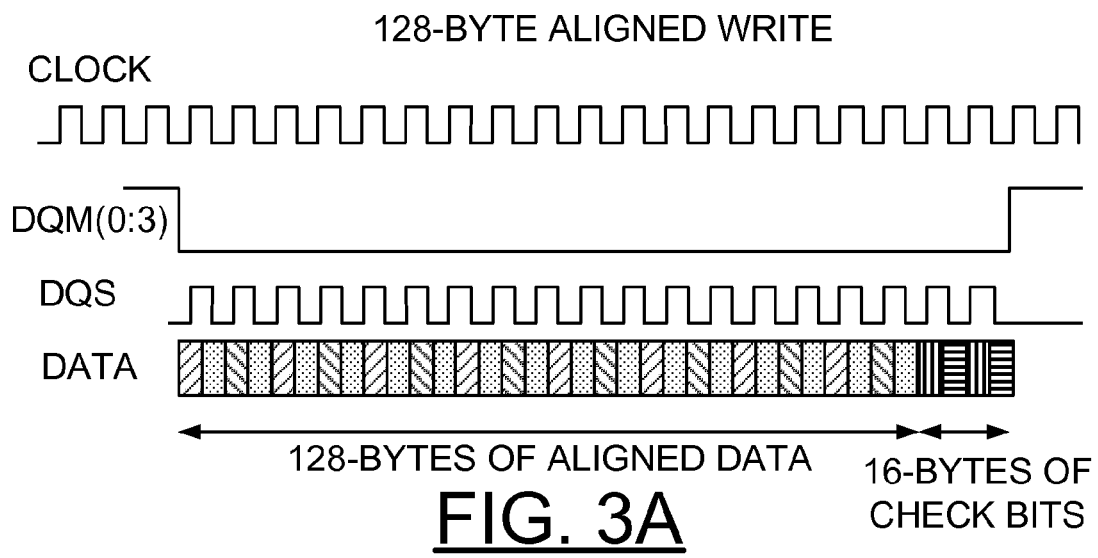
FIGS. 3A-3V are diagrams illustrating multiple write and read operations for accessing DATA and ECC in the DRAM of FIG. 1 with the preferred 4-byte bus embodiment in accordance with the preferred embodiment.
Figure 3B:
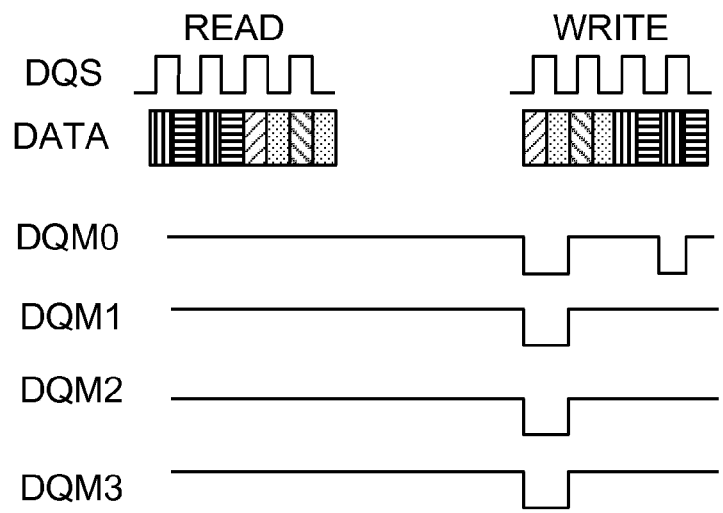
Figures 3C, 3D:
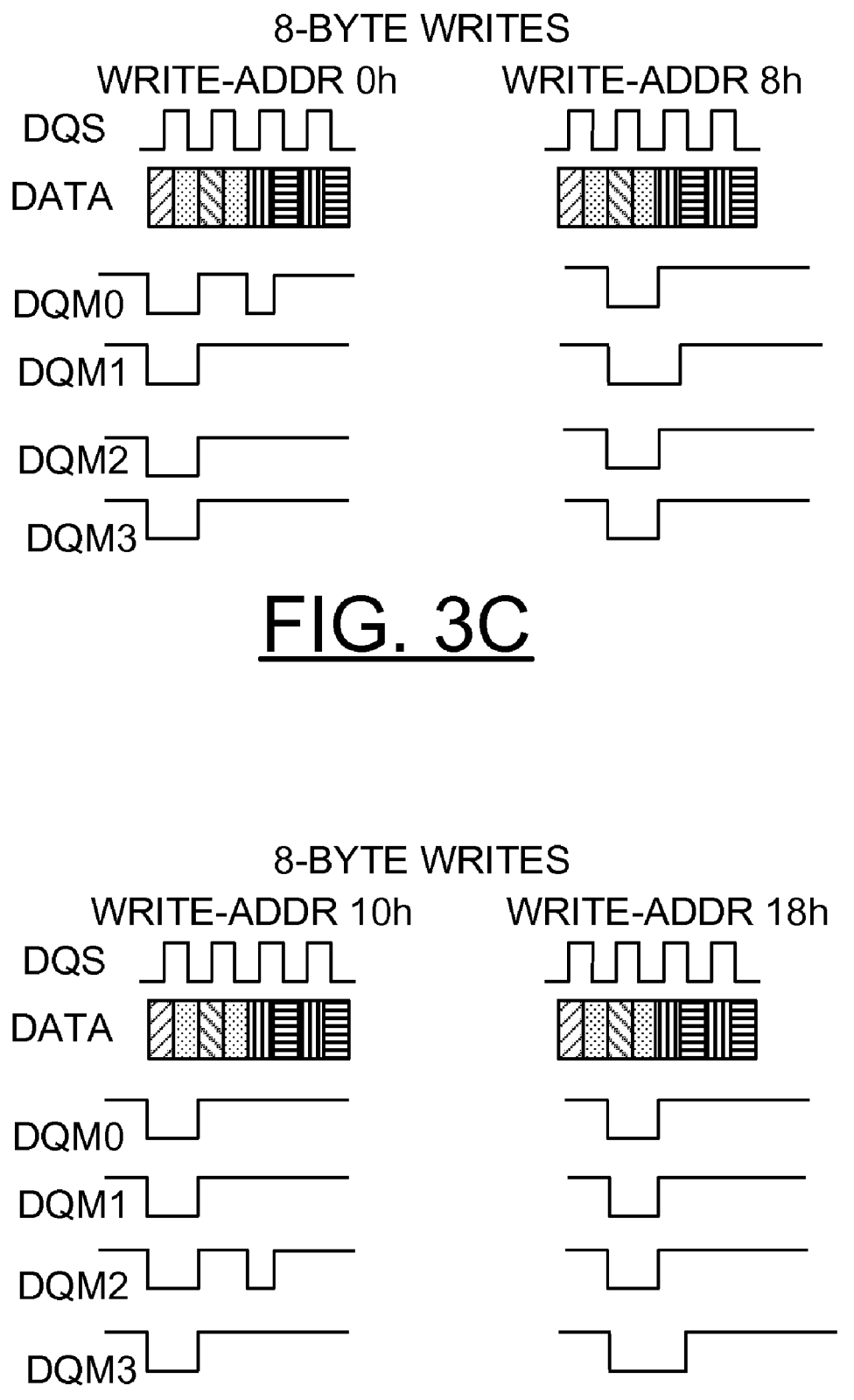
Figure 3E:
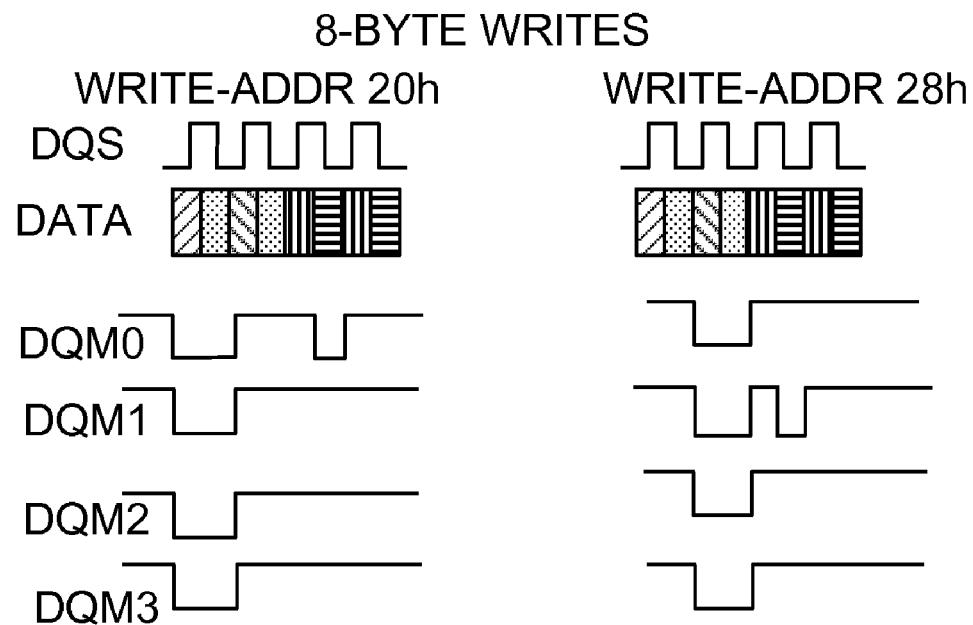
Figure 3F:
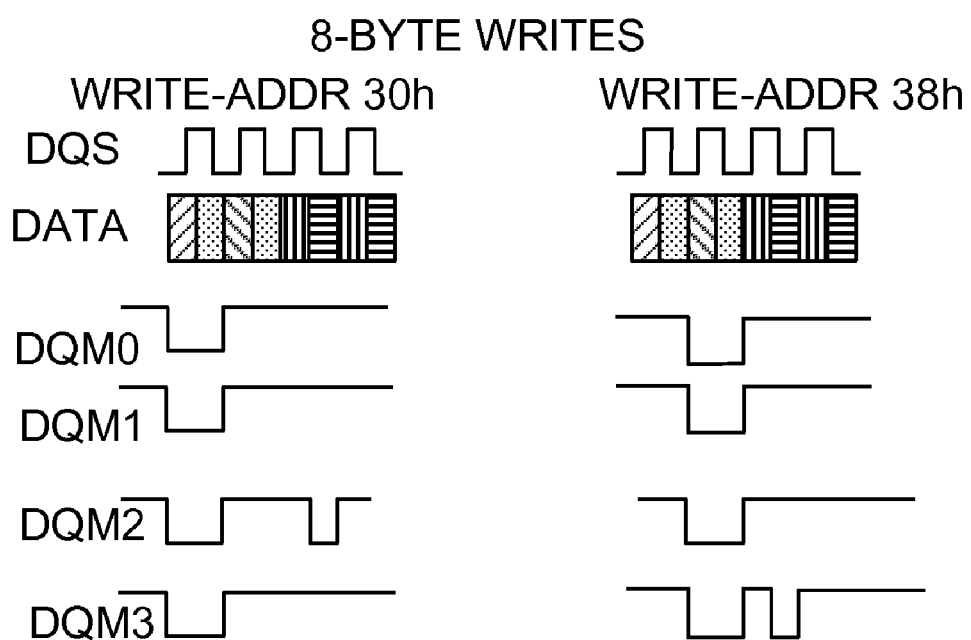
Figure 3G:
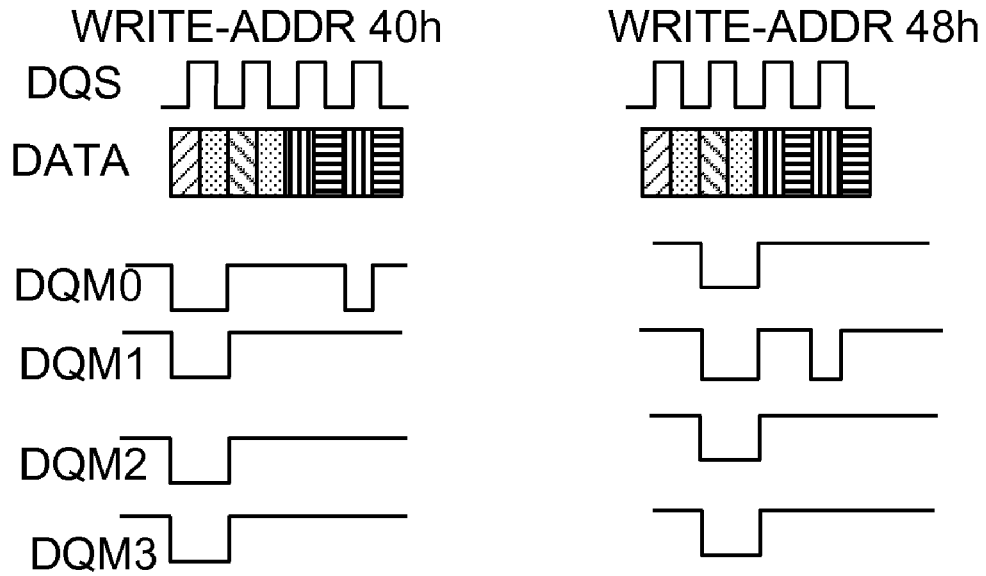
Figure 3H:
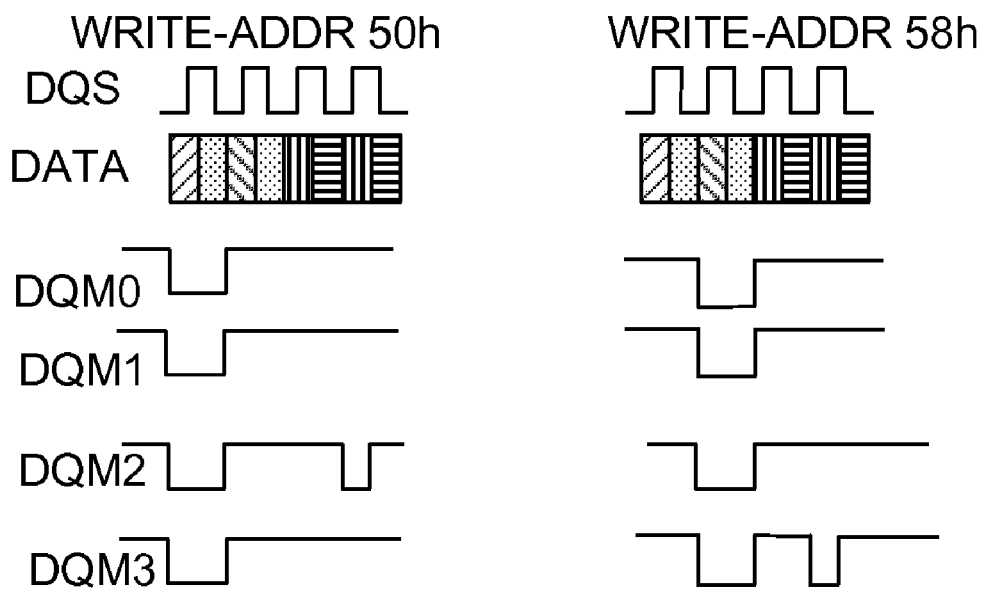
Figure 3I:
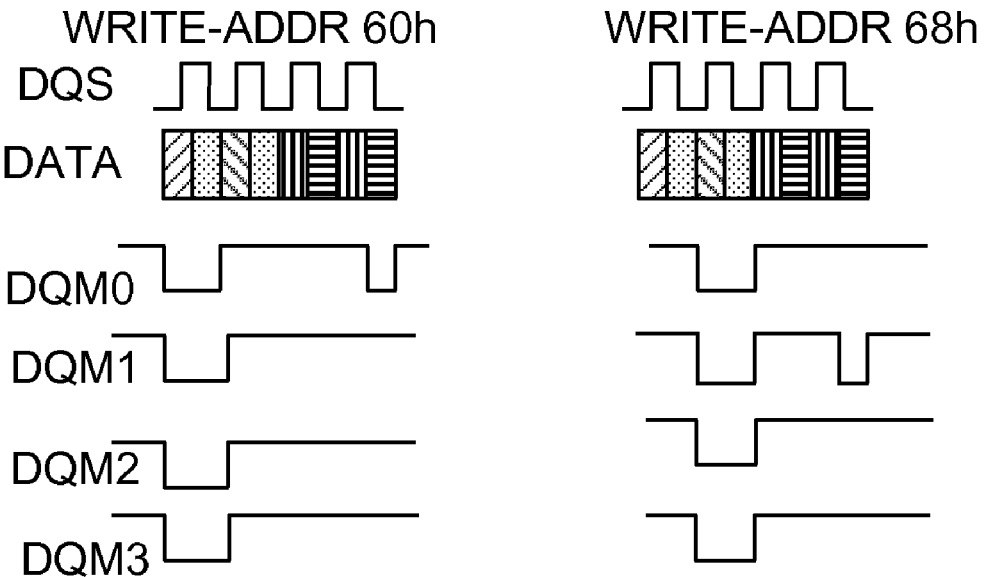
Figure 3J:
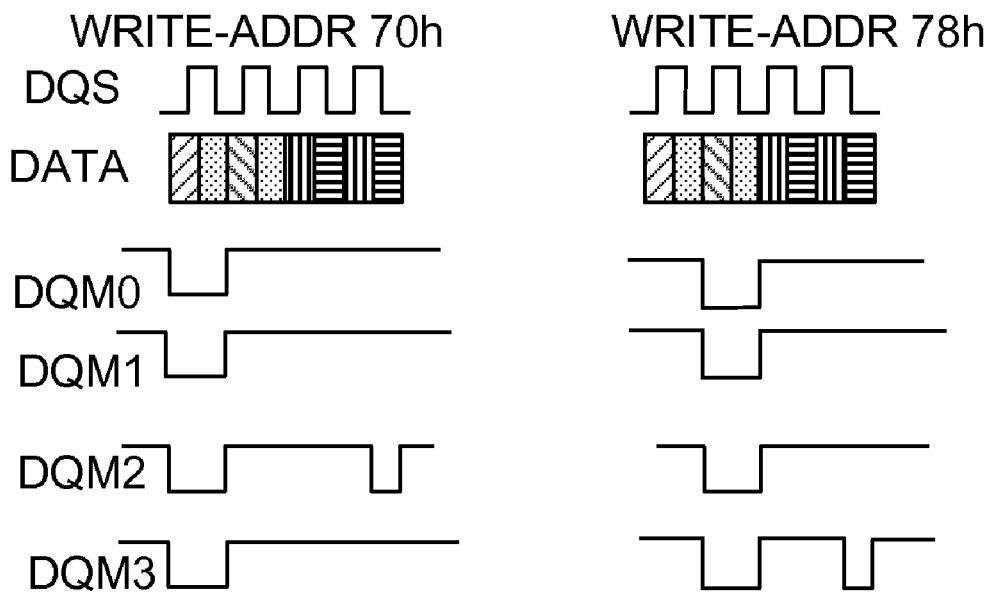
Figure 3M:
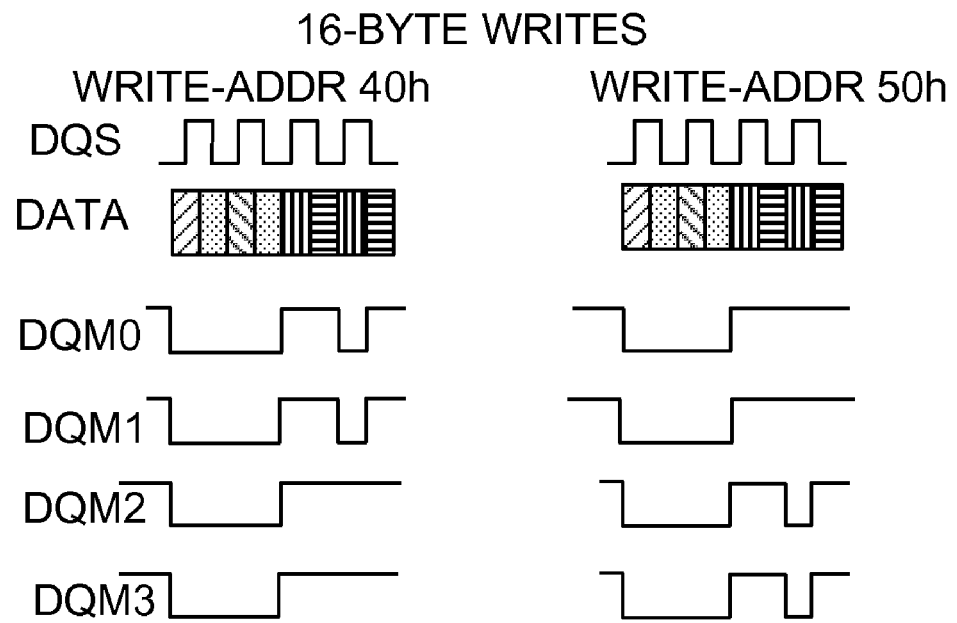
Figure 3N:
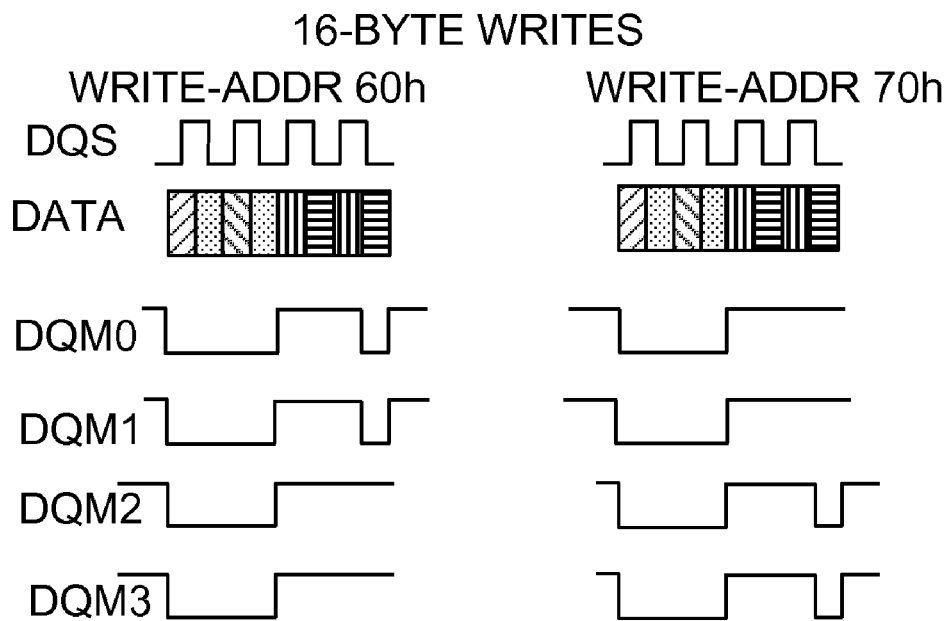
Figure 3O:
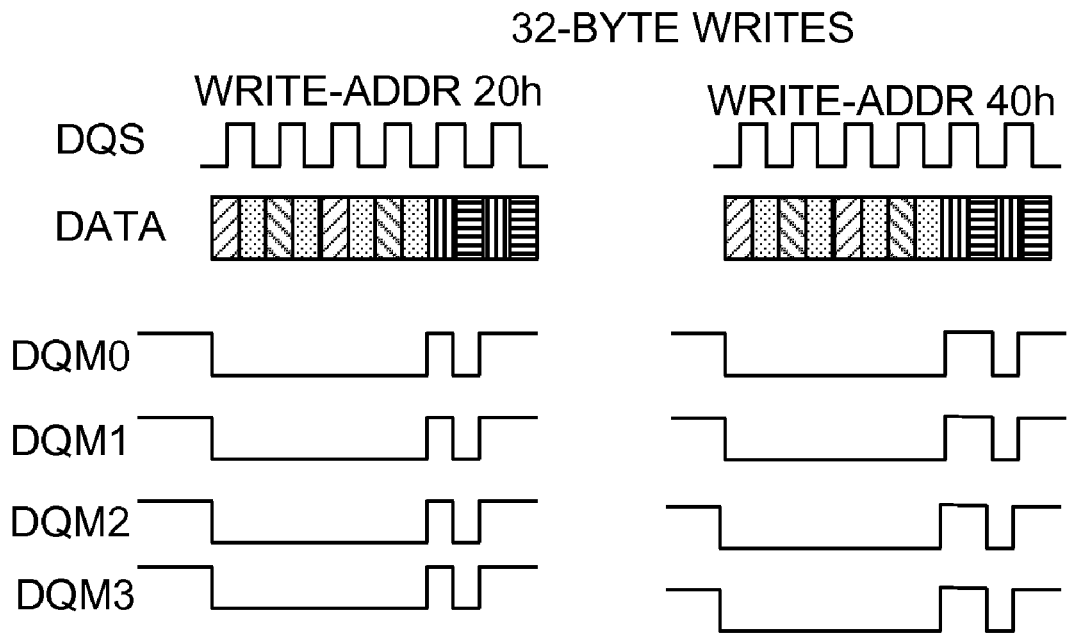
Figure 3P:
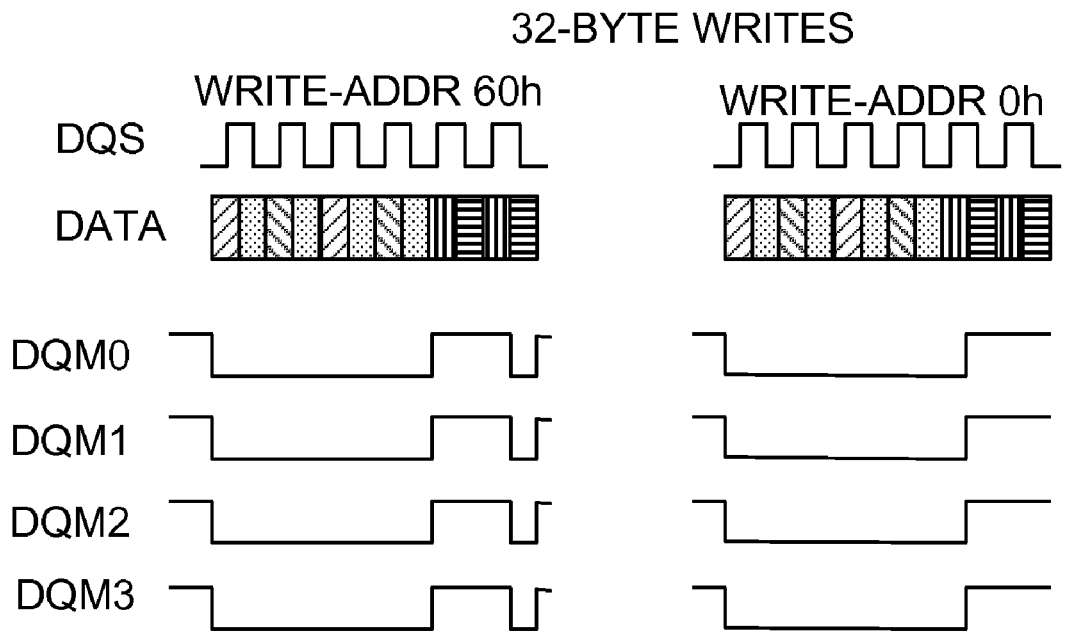
Figure 3Q:
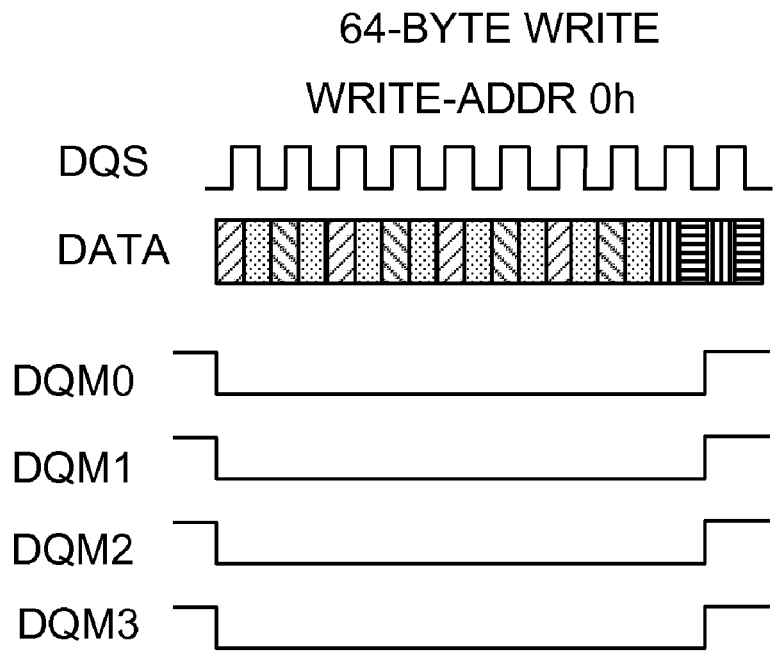
Figure 3R:
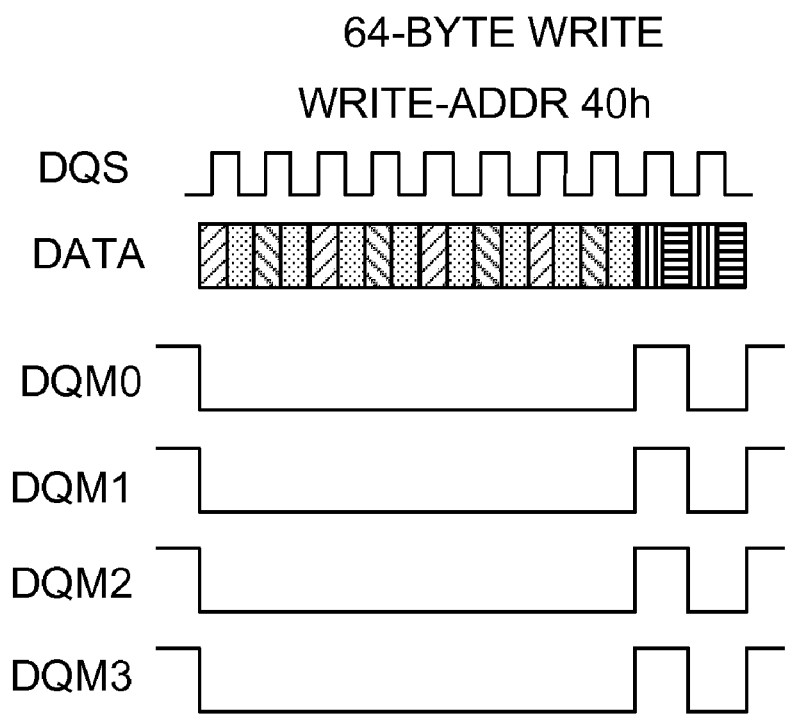
Figure 3S:
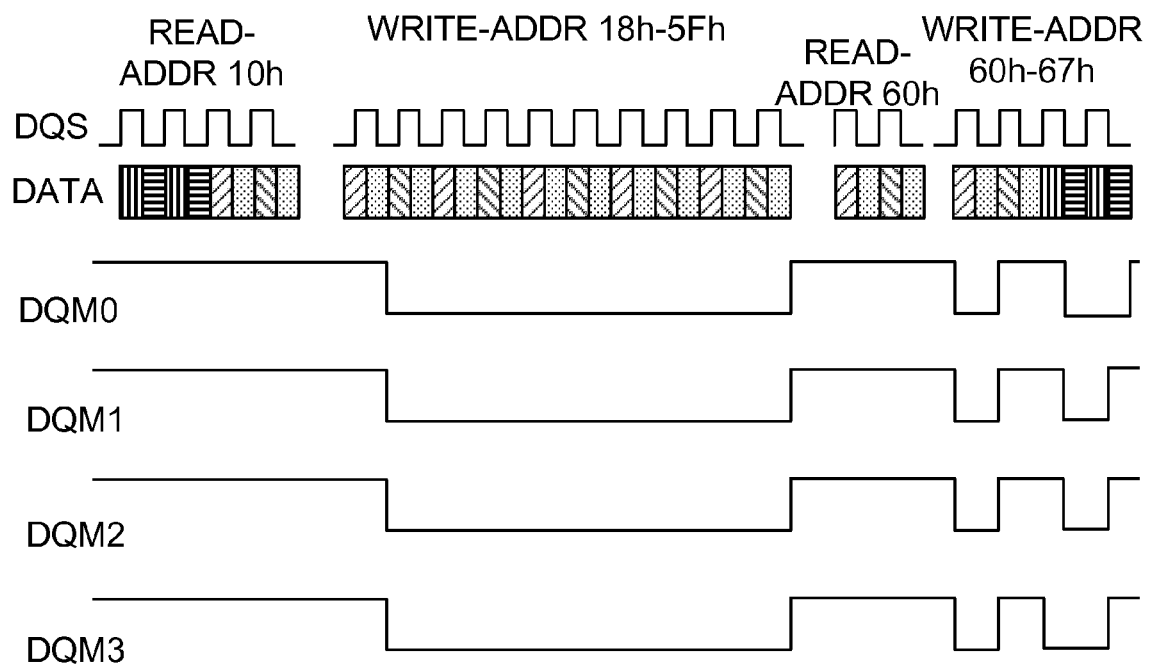
Figure 3T:
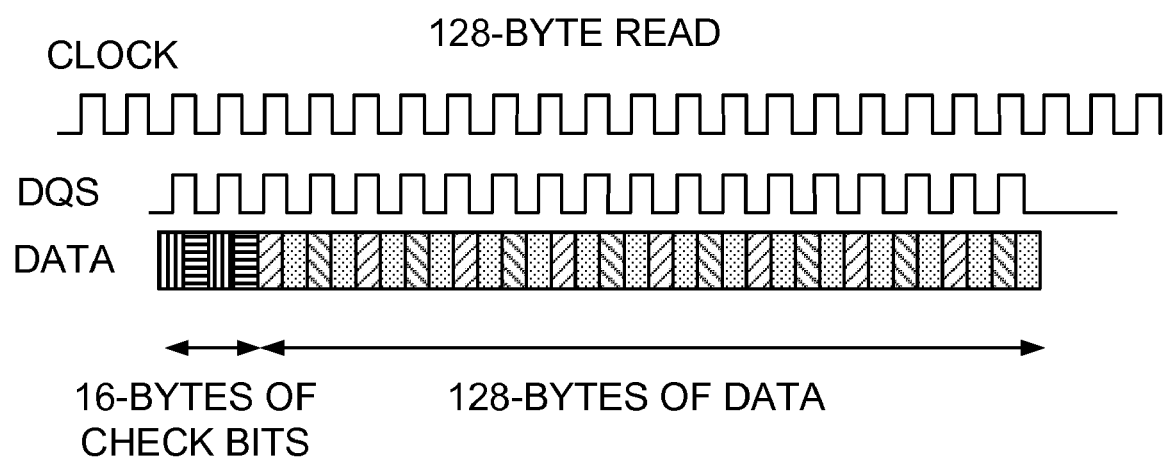
Figure 3U:
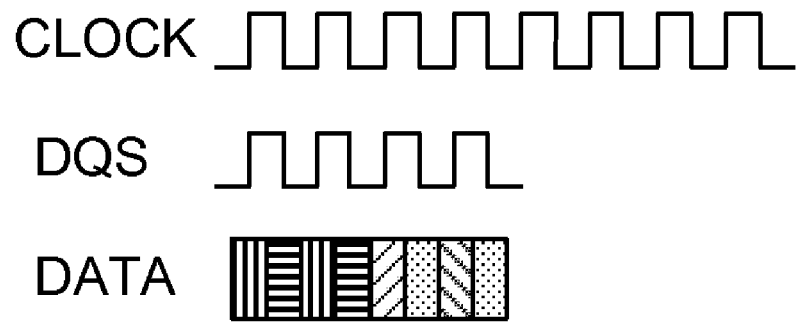
Figure 3V:
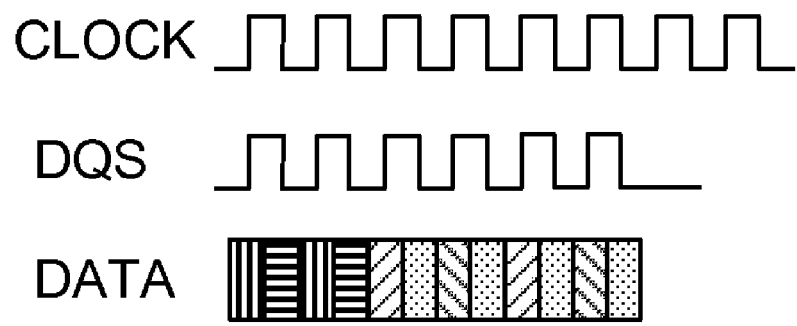

It should be understood that the principles of the present invention are not limited to a four byte wide bus, DRAM 106, as illustrated in FIGS. 3A-3V. For example, with a two byte wide bus, there would be only 2 DQMs and with an eight byte wide bus, there would be 8 DQMs. For example, with a two byte wide bus, 64-byte data bursts and 8-byte ECC bursts could be used or the design could stay with 128-byte bursts and 16-byte bursts. The same holds true for a one byte wide bus. It should be understood that the principles of the present invention are applicable for use with 8-byte or 16-byte or wider DRAM busses, while it is less likely this invention would be used since those designs would be less sensitive to the number of DRAM chips and chip 10 and their cost, so they would stay with 72-bit and 144-bit data busses. It should be understood that the principles of the present invention is very useful for cost sensitive adaptor designs.

In accordance with features of the preferred embodiments, bandwidth loss due to this invention during a burst is only about 12% due to the ECC being serially fetched with the data, and it is less if the RAS CAS access time is added in. But this loss is easy to make up, if needed, by running the DRAM 106 at a higher speed than the adaptor bandwidth requires. For example, running the DRAM logic asynchronous to the rest of the chip enables maximizing and matching the bandwidth. Also running the DRAM 106 synchronous to the logic with the invention, due to reduce pin count and DRAM parts on a card allowed having multiple DRAM busses, one for a volatile read cache and one for a non-volatile write cache, and one for code fetches, which would not been possible without this invention.

FIGS. 2A and 2B illustrate mapping of a memory real address into the GROUPs 200. A flat address 208 is converted to a physical address 206 such that the physical address only accesses the first 7 SECTIONs 202 of a GROUP 200. The flat address 208 is divided by 128 and then divided by 7 then the integer of that result is taken, multiplied by 128 and added back to the original flat address to generate the physical address 206.

FIGS. 3A-3V illustrate multiple write and read operations for accessing DATA and ECC in the DRAM 106 of FIG. 1 in accordance with the preferred embodiment. FIGS. 3A-3V illustrate vertical ECC with a 4-byte interface with the DRAM 106.

Referring to FIG. 3A, a 128-byte aligned write is shown including writing 128-bytes of a DATA SECTION 202, then writing the first 16-bytes of check bits in a corresponding ECC SECTION 204.

FIG. 3B illustrates an 8-byte read-modify-write (RMW) at flat address 40h modulo 80h including a read of 16-bytes of check bits in a particular ECC SECTION 204 followed by a read of 16-bytes of a corresponding DATA SECTION 202. Then a 16-byte data is written with the DATA MASK (DQM) used to allow the write of the 8-bytes that changed, followed by a 16-byte ECC written with the DATA MASK DQM0 used to mask off the ECC bytes that were not modified.

FIGS. 3C, 3D, 3E, 3F, 3G, 3H, 3I and 3J illustrate respective 8-byte writes at respective modulo 80h addresses 0h and 8h; 10h and 18h; 20h and 28h; 30h and 38h; 40h and 48h; 50h and 58h; 60h and 68h; and 70h and 78h. Each 8-byte write include an 8-byte data written in DATA SECTION 202 followed by a 16-byte ECC burst with only one byte of ECC written in a particular ECC SECTION 204 with a respective one of DATA MASKs DQM0-DQM3 used to mask off the DATA and ECC bytes that were not modified.

FIGS. 3K, 3L, 3M, and 3N illustrate respective 16-byte writes at respective modulo 80h addresses 0h and 10h; 20h and 30h; 40h and 50h; and 60h and 70h. Each 16-byte write include a 16-byte data written in DATA SECTION 202 followed by a 16-byte ECC with only two bytes of ECC written in a particular ECC SECTION 204 with a respective one of DATA MASKs DQM0-DQM3 used to mask off the ECC bytes that were not modified.

FIGS. 3O and 3P illustrate respective 32-byte writes at respective modulo 80h addresses 20h and 40h; and 60h and 0h. Each 32-byte write include a 32-byte data written in DATA SECTION 202 followed by a 16-byte ECC with only four bytes of ECC written in a particular ECC SECTION 204 with a respective one of DATA MASKs DQM0-DQM3 used to mask off the ECC bytes that were not modified.

FIGS. 3Q and 3R illustrate a respective 64-byte write at respective modulo 80h addresses 0h; and 40h. Each 64-byte write include a 64-byte data written in DATA SECTION 202 followed by a 16-byte ECC with only eight bytes of ECC written in a particular ECC SECTION 204 with a respective one of DATA MASKs DQM0-DQM3 used to mask off the ECC bytes that were not modified.

FIG. 3S illustrate a 77-byte read-modify-write (RMW) at start and end of op, address 19h. The RMW starts with a read at address 10h of 16-bytes of check bits in a particular ECC SECTION 204 followed by a read of 16-bytes of a corresponding DATA SECTION 202; a write at address 18h-5Fh, a data read at address 60h and a write at address 60h-67h. As shown in FIG. 3S, 7-bytes data are written at address 19h-1Fh and 64-byte data are written at address 20h-5Fh, followed by a 6-byte data is written at address 60h-65h, followed by a 16-byte ECC with 10 bytes of ECC written with a respective DATA MASK DQM0-DQM3 used to mask off the ECC bytes that were not modified.

FIG. 3T illustrates a 128-byte read including a read of a 16-byte ECC from a particular ECC SECTION 204 followed by a read of 128-byte data from a particular DATA SECTION 202.

FIG. 3U illustrates a 16-byte read including a read of a 16-byte ECC from a particular ECC SECTION 204 followed by a read of 16-byte data from a particular DATA SECTION 202.

FIG. 3V illustrates a 32-byte read including a read of a 16-byte ECC from a particular ECC SECTION 204 followed by a read of 32-byte data from a particular DATA SECTION 202.

Figure 4:
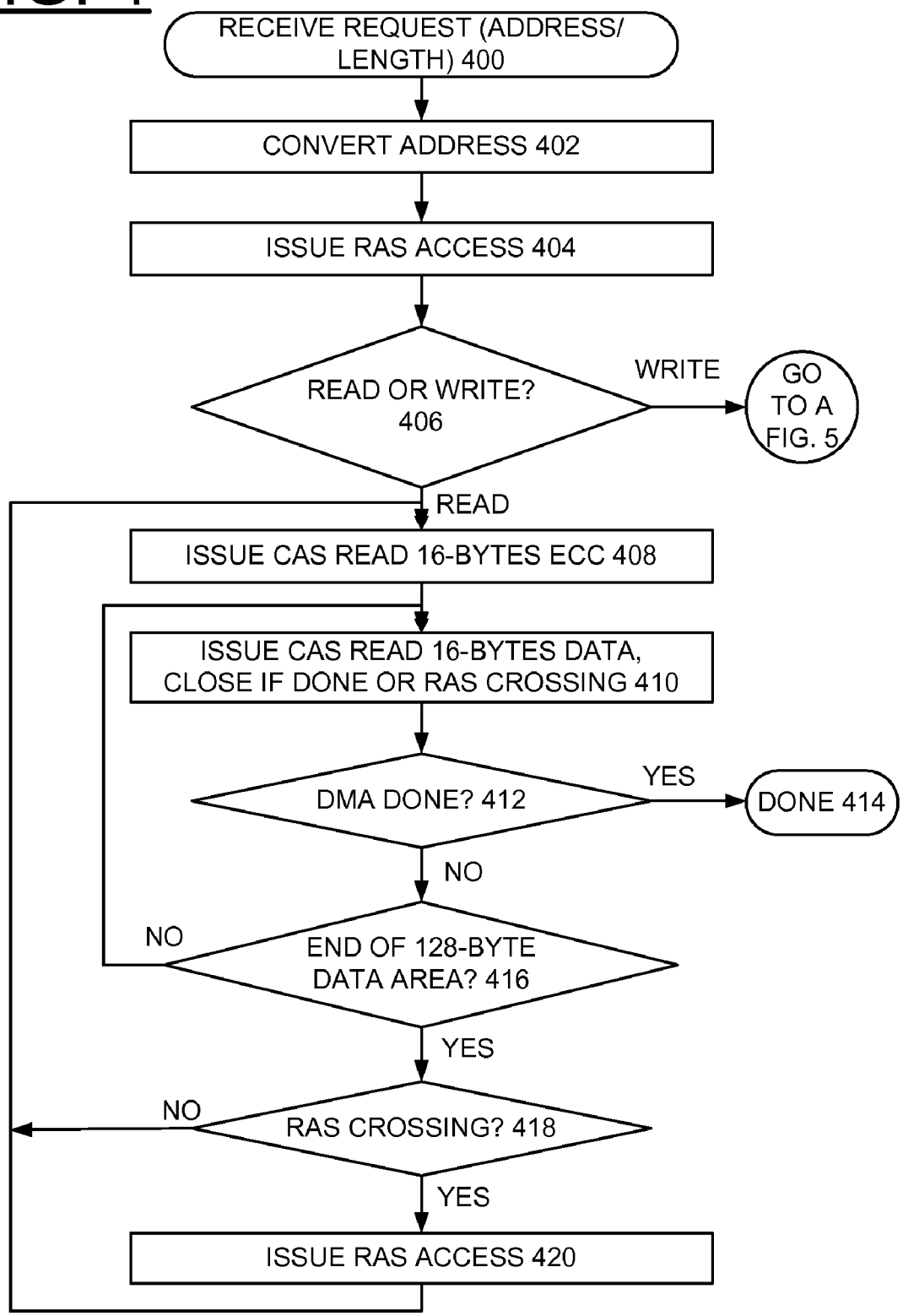
FIGS. 4 and 5 are flow charts illustrating exemplary steps for read and write operations for accessing DATA and ECC in the DRAM of FIG. 1 in accordance with the preferred embodiment.
Figure 5:
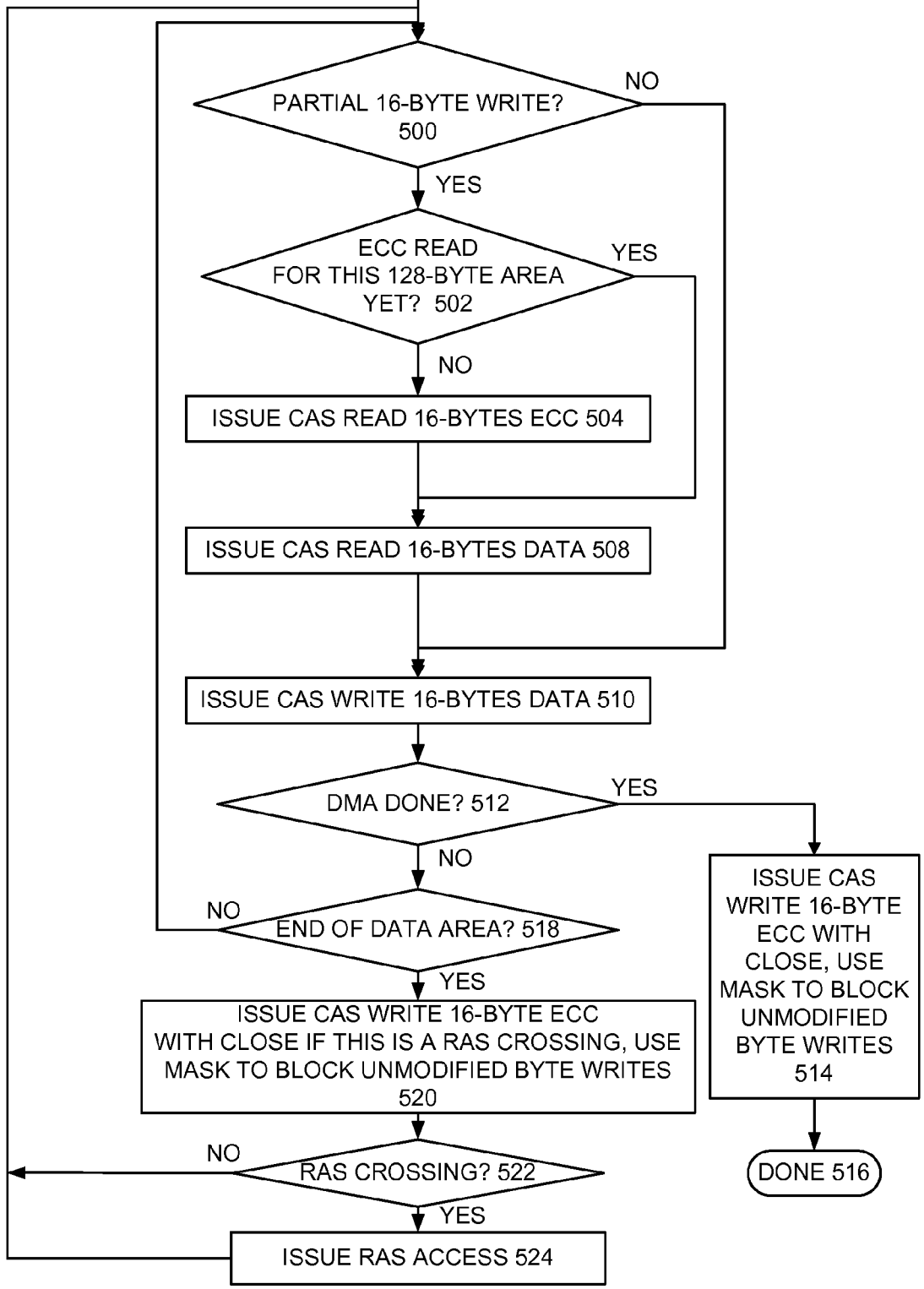

Referring to FIGS. 4 and 5, there are show exemplary steps for read and write operations for accessing DATA and ECC in the DRAM 106 of FIG. 1 in accordance with the preferred embodiment.

Referring now to FIG. 4, a request is received, for example, including an address and length, as indicated in a block 400. The received address is converted to a physical address as indicated in a block 402. Next a RAS access is issued as indicated in a block 404. Identifying a read or write request is performed as indicated in a decision block 406. When a write request is identified the exemplary steps continue following entry point A in FIG. 5.

When a read request is identified, then a CAS read of 16-bytes of ECC is issued as indicated in a block 408. Then a CAS read of 16-bytes of data is issued, closing if done or at a RAS crossing as indicated in a block 410. Checking whether the DMA is completed is performed as indicated in a decision block 412. If the DMA is done, then the exemplary steps are completed as indicated in a block 414. If the DMA is not done, then checking for an end of a data section 202 or a 128-byte data area is performed as indicated in a decision block 416. If an end of a data section 202 is not identified, then the exemplary steps return to block 410 to issue a CAS read of 16-bytes of data and continue. If an end of a data section 202 is identified, then checking for a RAS crossing is performed as indicated in a decision block 418. If a RAS crossing is not identified, then the exemplary steps return to block 408 to issue a CAS read of 16-bytes of ECC and continue. If a RAS crossing is identified, then a RAS access is issued as indicated in a block 420 and then the exemplary steps return to block 408 to issue a CAS read of 16-bytes of ECC and continue.

Referring now to FIG. 5, after a write request is identified the exemplary steps continue following entry point A with checking for a partial 16-byte write is performed as indicated in a decision block 500. If a partial 16-byte write is required, then checking whether an ECC read has been made for this 128-byte area is performed as indicated in a decision block 502. If an ECC read has not been made for this 128-byte area, then a CAS read for 16-bytes ECC is issued as indicated in a block 504. After the CAS read for 16-bytes ECC is issued at block 504 or if an ECC read has been made for this 128-byte area, then a CAS read of 16-bytes data is issued as indicated in a block 508. If a partial 16-byte write is not required or after the CAS read of 16-bytes data is issued at block 508, a CAS write of 16-bytes data is issued as indicated in a block 510.

Next checking whether the DMA is completed is preformed as indicated in a decision block 512. If the DMA is done, then a CAS write of 16-bytes ECC with close is issued, using a mask to block unmodified byte writes as indicated in a block 514. Then the exemplary steps are completed as indicated in a block 516.

Otherwise if the DMA is not done, then checking for an end of a data section 202 or a 128-byte data area is performed as indicated in a decision block 518. If an end of a data section 202 is not identified, then the exemplary steps return to block 500 to check for a partial 16-byte write and continue. If an end of a data section 202 is identified, then a CAS write of 16-bytes ECC with close if this is a RAS crossing is issued, using a mask to block unmodified byte writes as indicated in a block 520. Then checking for a RAS crossing is performed as indicated in a decision block 522. If a RAS crossing is identified, then a RAS access is issued as indicated in a block 524. If a RAS crossing is not identified or after a RAS access is issued at block 524, then the exemplary steps return to block 500 with checking for a partial 16-byte write and continue.

Figure 6:
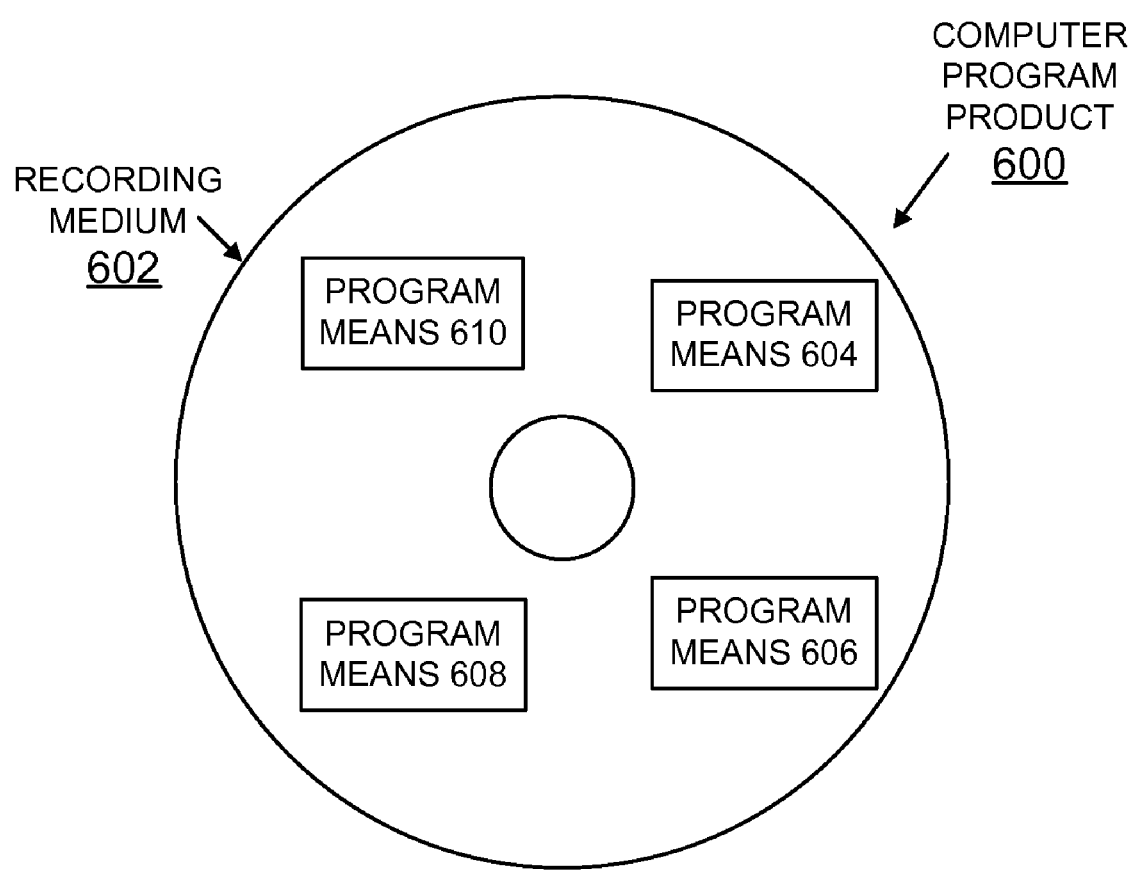
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing enhanced error correction coding (ECC) in a dynamic random access memory (DRAM) utilizing vertical ECC storage of the preferred embodiment in the memory system 100 of FIG. 1.

A sequence of program instructions or a logical assembly of one or more interrelated modules defined by the recorded program means 604, 606, 608, 610, direct the memory system 100 for implementing enhanced vertical ECC storage of the preferred embodiment.

While the present invention has been described with reference to the details of the embodiments of the invention shown in the drawing, these details are not intended to limit the scope of the invention as claimed in the appended claims.

What is claimed is:

1. Apparatus for implementing enhanced vertical ECC storage in a dynamic random access memory comprising:
   said dynamic random access memory (DRAM) split into a plurality of groups;
   each said group residing inside a DRAM row address strobe (RAS) page;
   each group being logically split into a plurality of segments for storing data and at least one segment for storing ECC for the data segments;
   a memory controller coupled to said DRAM; for a write operation, said memory controller writing data in a data segment followed by writing ECC for the written data in an ECC segment; and
   for a read operation, said memory controller reading ECC from an ECC segment followed by reading data from the data segment.

2. Apparatus for implementing enhanced vertical ECC storage as recited in claim 1 wherein each said group include 1K-bytes (1024 or 2**10 bytes) of the DRAM.

3. Apparatus for implementing enhanced vertical ECC storage as recited in claim 1 wherein each said group is logically split into eight segments of 128-bytes including seven 128-bytes data segments and one 128-bytes ECC segment.

4. Apparatus for implementing enhanced vertical ECC storage as recited in claim 1 includes one byte of ECC in the ECC segment for each eight bytes of data written in the data segment.

5. Apparatus for implementing enhanced vertical ECC storage as recited in claim 1 wherein for said write operation, said memory controller writing data aligned to the word width and writing ECC aligned for the written data word for ECC generation and correction, whereby the need for multiplexing or aligning of the data and ECC are eliminated.

6. Apparatus for implementing enhanced vertical ECC storage as recited in claim 1 wherein for said read operation with a large read burst, said memory controller issuing a row address strobe (RAS) access, then a column address strobe (CAS) access to read a first 16-bytes of ECC followed by a first 128-bytes of data of the data segment, followed by a read of a next 16-bytes of the ECC of the ECC segment, then a next 128-bytes of data of the data segment, and this sequence is repeated as required to complete the large read burst.

7. Apparatus for implementing enhanced vertical ECC storage as recited in claim 1 wherein for said write operation with a large write, said memory controller issuing a row address strobe (RAS) access, then a column address strobe (CAS) access to write a first 128-bytes of data of the data segment, followed by a write of a first 16-bytes of the ECC in the ECC segment, then a next 128-bytes of data is written in a next data segment, followed by a write of a next 16-bytes of the ECC in the ECC segment and this sequence is repeated as required to complete the write.

8. Apparatus for implementing enhanced vertical ECC storage as recited in claim 1 wherein for a read access smaller than 128-bytes, said memory controller issuing a row address strobe (RAS) access, then a column address strobe (CAS) access to read 16-bytes of ECC followed by a column address strobe (CAS) access to read N bytes of DATA.

9. Apparatus for implementing enhanced vertical ECC storage as recited in claim 1 wherein for a write access smaller than 128-bytes, said memory controller issuing a row address strobe (RAS) access, then a column address strobe (CAS) access to write N bytes of DATA followed by a column address strobe (CAS) access to write 16-bytes of ECC with a DATA MASK used to mask off each ECC byte not modified.

10. Apparatus for implementing enhanced vertical ECC storage as recited in claim 1 includes said DRAM having multiple bank support and wherein said groups are ordered with a next group in order placed under a next bank, whereby a burst can cross from one group to a next logical group without a wait for the current RAS page to be closed then reopened.

11. Apparatus for implementing enhanced vertical ECC storage as recited in claim 10 wherein said DRAM has four banks 0-3 and wherein said groups are ordered from RAS N bank 0, to RAS N bank 1, to RAS N bank 2 to RAS N bank 3 to RAS N+1 bank 0 to RAS N+1 bank 1.

* * * * *